United States Patent
Wilson

(10) Patent No.: US 12,455,077 B2
(45) Date of Patent: Oct. 28, 2025

(54) GAS-BURNING FIRE INSTALLATION WITH AN IGNITER CONTROL SYSTEM

(71) Applicant: Travis Industries, Inc., Mukilteo, WA (US)

(72) Inventor: Aiden Wilson, Duvall, WA (US)

(73) Assignee: Travis Industries, Inc., Mukilteo, WA (US)

( * ) Notice: Subject to any disclaimer, the term of this patent is extended or adjusted under 35 U.S.C. 154(b) by 369 days.

(21) Appl. No.: 18/164,273

(22) Filed: Feb. 3, 2023

(65) Prior Publication Data

US 2023/0250956 A1    Aug. 10, 2023

Related U.S. Application Data

(60) Provisional application No. 63/306,972, filed on Feb. 4, 2022.

(51) Int. Cl.
*F23N 5/24*    (2006.01)

(52) U.S. Cl.
CPC .......... *F23N 5/242* (2013.01); *F23N 2225/08* (2020.01); *F23N 2227/02* (2020.01)

(58) Field of Classification Search
CPC ... F23N 5/242; F23N 2225/08; F23N 2227/02
USPC ................................................ 431/6, 18–90
See application file for complete search history.

(56) References Cited

U.S. PATENT DOCUMENTS

| | | |
|---|---|---|
| 2007/0068511 A1 | 3/2007 | Bachinsky et al. |
| 2007/0292810 A1 | 12/2007 | Maiello et al. |
| 2010/0326421 A1 | 12/2010 | Atemboski et al. |
| 2013/0330675 A1 | 12/2013 | Strong |
| 2014/0186779 A1 | 7/2014 | Chodacki et al. |
| 2014/0212821 A1* | 7/2014 | Banu .................. F24C 3/103 431/77 |
| 2015/0159881 A1 | 6/2015 | Cadima |
| 2015/0292745 A1 | 10/2015 | Powell |

OTHER PUBLICATIONS

International Searching Authority, International Search Report and Written Opinion, PCT Patent Application PCT/US2023/012308, mailed Apr. 14, 2023, 16 pages.

* cited by examiner

*Primary Examiner* — Vivek K Shirsat
(74) *Attorney, Agent, or Firm* — Perkins Coie LLP

(57) ABSTRACT

The present disclosure relates to gas-burning fire installations, such as gas-burning fireplace assemblies, fire table assemblies, gas lamps, gas torches, lanterns, other gas-burning lighting features, heated fountains, etc., that have fuel igniters and igniter control systems. Some embodiments provide a gas-burning fire installation that has a control unit configured to operate in an ignition mode or a run mode, and check for Proof of Flame (POF) gain or loss based on temperature readings by a sensor coupled to a burner and the control unit.

17 Claims, 5 Drawing Sheets

GAS-BURNING FIRE INSTALLATION WITH AN IGNITER CONTROL SYSTEM

CROSS-REFERENCE TO RELATED APPLICATIONS

The present application claims the benefit of U.S. Provisional Patent Application No. 63/306,972, titled Gas-Burning Fire Installation with an Igniter Control System, filed Feb. 4, 2022, the disclosure of which is incorporated herein by reference in its entirety.

TECHNICAL FIELD

The present invention is directed to gas-burning fire installations, and, more particularly, to gas-burning fire installations with igniters.

BACKGROUND

Conventional gas-burning fireplace assemblies and other fire installations often use igniters to ignite the gas and start the fire. For example, outdoor gas-burning fireplaces can include igniters. These outdoor, gas-burning fireplaces, such as fire table assemblies, are popular decorative installations that can provide a highly aesthetic, fire-based focal point to a patio, deck, yard, or other suitable location. The fire table assemblies, which are also referred to as fire tables, tabletop fire pits, patio fire tables, etc., also provide safe and convenient areas with an integral heat source for comfortable outdoor gatherings. Conventional outdoor fireplace assemblies can have difficulties initiating, controlling, and managing the flame, particularly when the fireplace unit is cold or exposed to difficult environmental conditions, such as cold temperatures, rain, wind, or the like. Some conventional outdoor gas-burning fireplaces have utilized igniters to start ignition of the fuel gas. These ignitors, however, have been difficult to adequately control in the outdoor environment. There is a need for a gas-burning fire installation with an igniter control system to manage utilization and operation of the igniter, particularly in outdoor environments.

SUMMARY

The present technology provides gas-burning fire installations with igniters and igniter control systems that overcome drawbacks experienced in the prior art and provide other benefits. An embodiment of the present technology provides a gas-burning fire installation that has a burner, a fuel line coupled to the burner and configured to carry a fuel gas to the burner for ignition, and a control valve coupled to the fuel line and positioned to control fuel gas flow toward the burner. A sensor is coupled to the burner, an igniter is adjacent to the burner, and a control unit is operatively coupled to the control valve, the sensor, and the igniter. The control unit is configured to operate in an ignition mode and a run mode. While operating in the ignition mode, the control unit is configured to turn on power to the control valve, the sensor, and the igniter, so as to allow the igniter to heat up for an igniter heating period. The control unit operates the control valve to direct a flow of fuel gas to a burner of the gas-burning fire installation and allows the igniter to ignite the flow of fuel gas at or adjacent to the burner. The control unit checks for Proof of Flame (POF) gain based on data from the sensor. The control unit in the ignition mode is further configured to, upon determining that there is POF gain, switch to operating in the run mode. Upon determining that there is no POF gain after a POF waiting period, the control unit operates the control valve to terminate the flow of fuel gas to the burner, turns off the igniter, waits for a first re-ignition period, and retries ignition of the burner for a predetermined number of attempts. The control unit turns off power to the control valve and the igniter upon failing to determine that there is POF gain after retrying ignition of the burner for the predetermined number of attempts. While operating in the run mode, the control unit is configured to repeatedly check for POF loss based on data from the sensor. Upon determining that there is POF loss, the control unit operates the control valve to terminate the flow of fuel gas to the burner, waits for a second re-ignition period, operates the control valve to direct the flow of fuel gas to the burner, and allows the igniter to reignite the flow of fuel gas at or adjacent to the burner.

Another embodiment of the technology provides a method of operating a gas-burning fire installation, which includes operatively coupling a control unit to a control valve, a sensor, and an igniter of the gas-burning fire installation. The control unit is configured to operate in an ignition mode and a run mode. While operating the control unit in the ignition mode, the method includes turning on power to the control valve, the sensor, and the igniter, and allowing the igniter to heat up for an igniter heating period. The method includes operating the control valve to direct a flow of fuel gas to a burner of the gas-burning fire installation, allowing the igniter to ignite the flow of fuel gas at or adjacent to the burner, and checking for Proof of Flame (POF) gain based on data from the sensor. Upon determining that there is POF gain, the method includes switching to operate the control unit in the run mode, and upon determining that there is no POF gain after a POF waiting period, deactivating the control valve to terminate the flow of fuel gas to the burner. The method includes turning off the igniter, waiting for a first re-ignition period, retrying ignition of the burner for a predetermined number of attempts, and turning off power to the control valve, the sensor, and the igniter upon failing to determine that there is POF gain after retrying ignition of the burner for the predetermined number of attempts. While operating the control unit in the run mode, the method further includes repeatedly checking for POF loss based on data from the sensor. Upon determining that there is POF loss, the method includes operating the control valve to terminate the flow of fuel gas to the burner, waiting for a second re-ignition period, reactivating the control valve to direct the flow of fuel gas to the burner, and allowing the igniter to reignite the flow of fuel gas at or adjacent to the burner.

Another embodiment of the technology provides a non-transitory computer-readable medium storing instructions for performing a method of operating a gas-burning fire installation that has a control unit coupled to control valve, a sensor, and an igniter. The control unit is configured to operate in an ignition mode and a run mode. The method includes operatively coupling a control unit to a control valve, a sensor, and an igniter of the gas-burning fire installation, wherein the control unit is configured to operate in an ignition mode and a run mode. While operating the control unit in the ignition mode, the method further includes turning on power to the control valve, the sensor, and the igniter, and allowing the igniter to heat up for an igniter heating period. The method includes operating the control valve to direct a flow of fuel gas to a burner of the gas-burning fire installation, allowing the igniter to ignite the flow of fuel gas at or adjacent to the burner, checking for Proof of Flame (POF) gain based on data from the sensor. Upon determining that there is POF gain, the method includes switching to operate the control unit in the run mode, and upon determining that there is no POF gain after a POF waiting period, deactivating the control valve to terminate the flow of fuel gas to the burner. The method includes turning off the igniter, waiting for a first re-ignition period, retrying ignition of the burner for a predetermined number of attempts, and turning off power to the control valve, the sensor, and the igniter upon failing to determine that there is POF gain after retrying ignition of the burner for the predetermined number of attempts. While operating the control unit in the run mode, the method further includes repeatedly checking for POF loss based on data from the sensor. Upon determining that there is POF loss, the method includes operating the control valve to terminate the flow of fuel gas to the burner, waiting for a second re-ignition period, reactivating the control valve to direct the flow of fuel gas to the burner, and allowing the igniter to reignite the flow of fuel gas at or adjacent to the burner.

BRIEF DESCRIPTION OF THE DRAWINGS

The technology and techniques introduced here may be better understood by referring to the following Detailed Description in conjunction with the accompanying drawings, in which like reference numerals indicate identical or functionally similar elements.

DETAILED DESCRIPTION

Figure 1A:
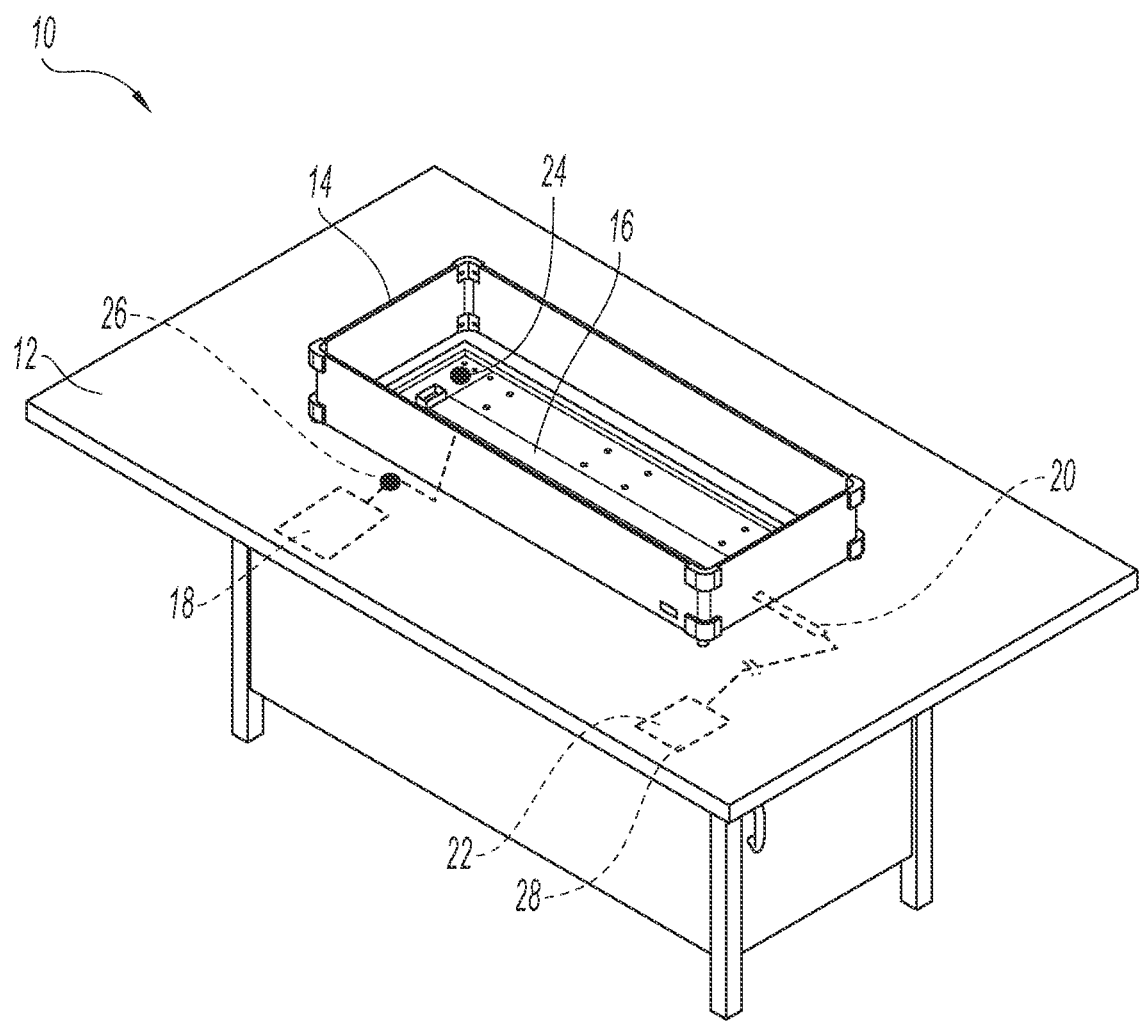
FIG. 1A is an isometric view of a gas-burning fire installation with an igniter and igniter control system in accordance with aspects of the present technology.
Figure 1B:
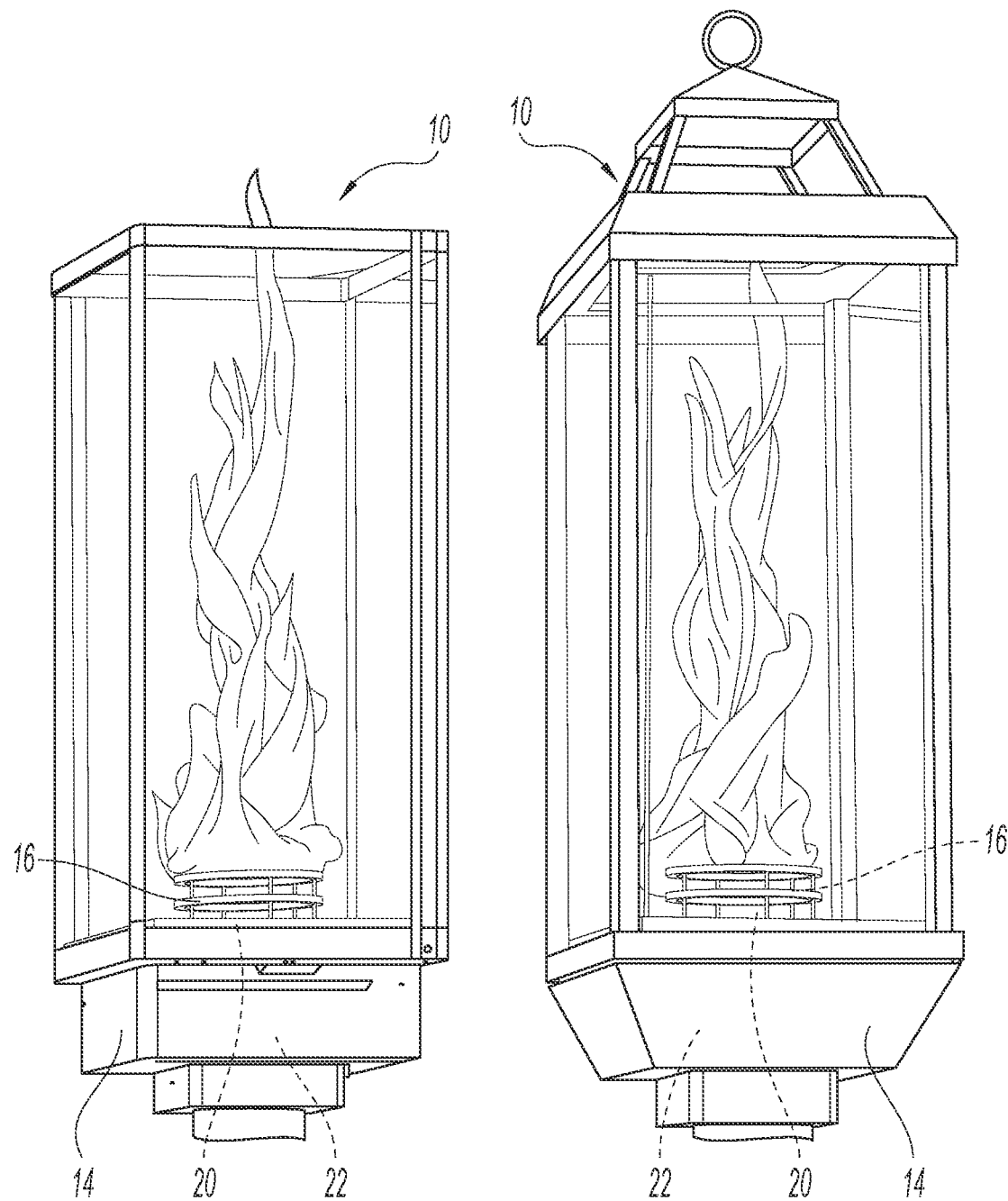
FIG. 1B is an image of gas-burning torches or lanterns with an igniter and igniter control system in accordance with aspects of the present technology.

Aspects of the present disclosure are directed to gas-burning fire installations, such as gas-burning fireplace assemblies, fire table assemblies, gas lamps, gas torches, lanterns, other gas-burning lighting features, fire/water fountains, etc., that have fuel igniters and igniter control systems. FIG. 1A is a schematic view of an outdoor, gas-burning fire installation 10 with a fireplace unit 12 having a body structure 14 containing a gas burner 16 coupled to a source of fuel gas 18 via a fuel line. FIG. 1B is an image of another gas-burning installation (e.g., a torch or lantern) with an igniter and igniter control system in accordance with aspects of the present technology. While the description of the illustrated embodiment is in connection with an outdoor fireplace assembly, it is to be understood that the technology of the present disclosure, including the igniter and igniter control system, is also applicable to other gas-burning fire installation assemblies, including but not limited to fireplace assemblies, fire tables, lamps, torches, lanterns, other gas-burning lighting features, fire/water fountains, or other fire installations.

In embodiments of the present technology, an igniter 20, such as an electric igniter, is coupled to the body structure 14 and positioned adjacent to the burner 16. The igniter 20 is positioned and configured to be activated to ignite a flow of the fuel gas at or adjacent to the burner 16. The igniter 20 is coupled to a control unit 22, which controls operation of the igniter, including activation, deactivation, and sequencing of the igniter 20. The control unit 22 can also be configured to control or manage other features of the gas-burning fireplace system. For example, the control unit 22 may be coupled to one or more sensors 24 in the fireplace unit, such as temperature sensors, fuel-flow sensors, humidity sensors, exhaust sensors, optical sensors, timers, and/or other suitable sensors. The control unit 22 is also coupled to and configured to control the fuel gas system, including flow control valves 26 that control the flow of fuel gas to the burner through the fuel line.

The control unit 22 is configured to monitor operation of the fireplace unit 12, including the burner 16 and the gas flow to the burner to control the fire within the fireplace unit 12. The control unit 22 can include a processor 28 (e.g., a CPU, microcontroller, or other adequate processor) operatively coupled to the one or more sensors 24 and the control valve 26 to control the gas flow to the burner. The processor 28 can be a single processing unit or multiple processing units in a device or distributed across multiple devices. Processors 28 can be coupled to other hardware devices, for example, with the use of a bus, such as a PCI bus. The processors 110 can be configured to communicate with a hardware controller, such as a remote controller that may include a display, such as an LCD display, for displaying text and graphics that may provide graphical and textual visual feedback and/or audible feedback to a user. Other I/O devices can also be coupled to the processor, such as a network card, video card, audio card, USB, speakers, lighting, etc.

In some implementations, the processor 28 may be configured to communicate via wire or wirelessly with the sensors, flow control valves, and/or other hardware devices. The processor 28 can have access to a memory in a device or distributed across multiple devices. A memory includes one or more of various hardware devices for volatile and non-volatile storage and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory can include program memory that stores programs and software, such as an operating system, and other application programs. Memory can also include data memory (e.g., the PCM streaming audio data, configuration data, settings, user options or preferences, etc.) which can be provided to the program memory or any element of the control unit 22.

In some implementations, the processor 28 may include one or more solid-state triac relays configured to provide switching (e.g., zero-crossing switching) to a power supply, such as a 24vac source. The use of solid-state triacs reduces the size of the processor 28 when compared to the use of other relays. The processor 28 can be stored in resin to prevent contact with water. For example, the processor 28 can be kept in a custom injection molded box filled with resin to create a waterproof enclosure that is not too bulky or expensive.

Some implementations can be operational with numerous other computing system environments or configurations. Examples of computing systems, environments, and/or configurations that may be suitable for use with the technology include, but are not limited to, personal computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
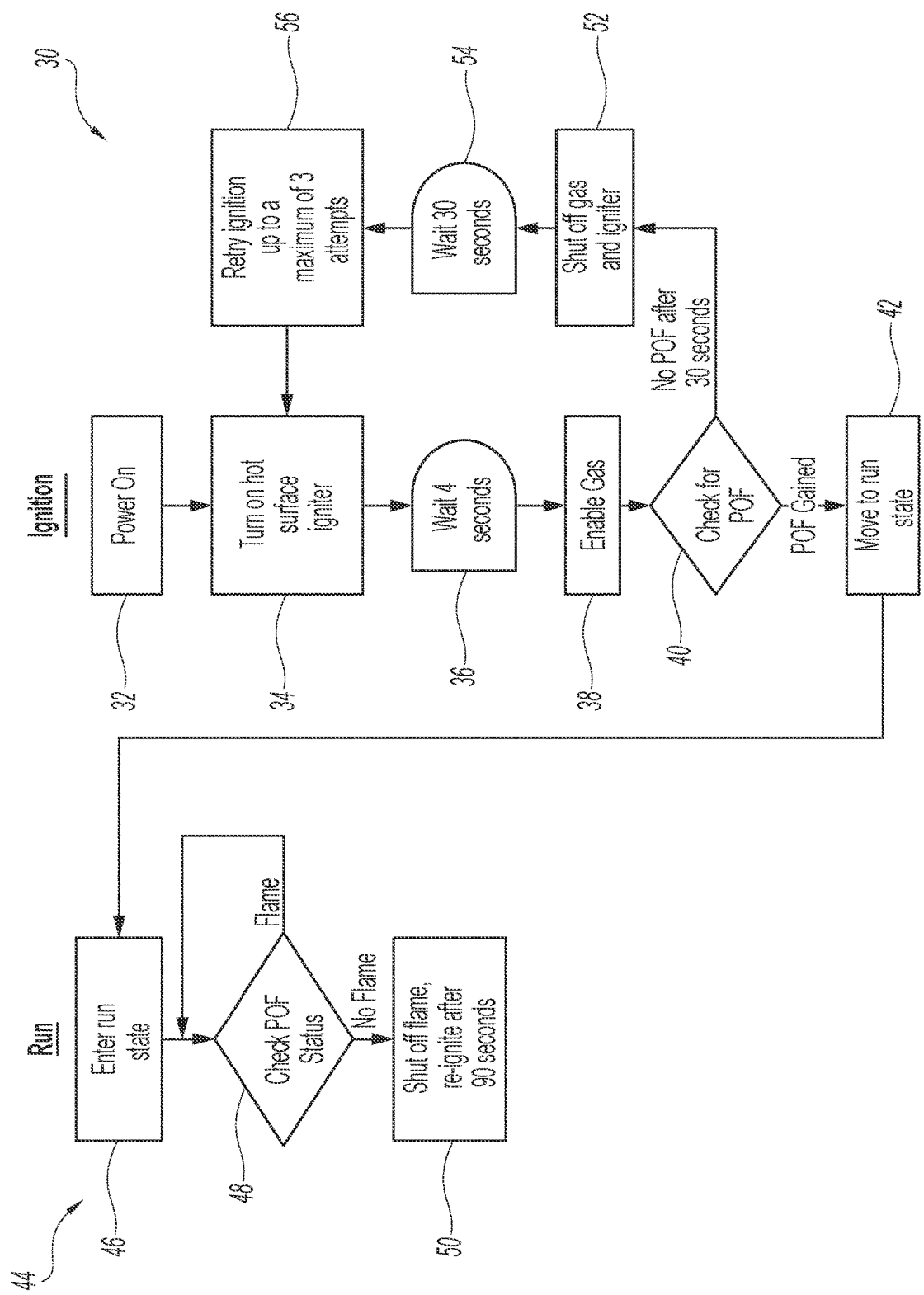
FIG. 2 is a flow diagram illustrating an ignition mode and a run mode of a process implemented by the igniter controller in accordance with one or more aspects of the present technology.

FIG. 2 is a flow diagram illustrating a process used in some embodiments of the control unit 22 of the present technology for ignition of the fuel gas in the gas-burning fire installation, such as a fireplace unit. This ignition process can be configured to control activation/deactivation of the fuel flow, activation/deactivation of the igniter, flame generation and control, and Proof of Flame (POF) gain/loss detection in the fireplace unit. The control unit is initially in an "Ignition" mode 30, which begins, at step 32, with turning on the power to the fire installation to provide power to the igniter, sensors, control valves, and/or other powered components. At step 34, the igniter adjacent to the burner assembly in the fireplace unit is turned on. At step 36, the igniter is allowed to heat up for an igniter heating period (e.g., two seconds, four seconds, six seconds, etc.). After the igniter heating period has elapsed, at step 38, the fuel flow control valve is activated to direct a flow of the fuel gas from the gas source to the burner. Upon activating the fuel flow control valve, the flow of fuel gas flows to and exits the burner adjacent to the heated igniter, which ignites the flow of fuel gas and generates the fire in the fire installation.

At step 40, the control unit checks for POF gain based on information or data from sensors to determine whether the fuel gas at the burner has actually been ignited and is burning as expected, or the fuel gas has not ignited. Sometimes, the fuel gas may not ignite in one or more attempts because of insufficient or untimely operation of components in the gas-burning unit, or external environmental conditions such as wind, rain, flow impingement, etc. If POF gain is established (discussed in greater detail below), at step 42, the control unit 12 changes from the "Ignition" mode 30 to the "Run" mode 44, wherein the process enters the run state at step 46.

At step 48, when the process is in the run state, the control unit checks for POF loss based on information or data from the sensors in the fire installation. If POF loss is detected, indicating that there is no flame burning in the unit, at step 50, the flow of fuel gas to the burner is terminated by closing or deactivating the fuel flow control valve so as to shut off any potential flame at the burner. The system waits for a POF loss re-ignition period (e.g., 60 seconds, 90 seconds, 120 seconds, etc.), and then reactivates the fuel flow control valve and re-ignites the fuel gas at or adjacent to the burner via the igniter. If at step 48, POF loss is not detected, indicating that there is a flame as expected, the process continues in the "Run" mode 44. The control unit is configured to regularly or continuously monitor operation of the unit and confirm the POF status while in the "Run" mode 44 until the unit is manually or automatically turned off.

Returning to step 40, if POF gain is not detected after a POF waiting period (e.g., 15 seconds, 30 seconds, 45 seconds, etc.), indicating that there is no flame ignited at the burner, then at step 52, the igniter is turned off and the fuel flow control valve is closed or deactivated to terminate the flow of fuel gas to the burner. At step 54, the system then waits for a POF gain re-ignition period (e.g., 15 seconds, 30 seconds, 45 seconds, etc.). At step 56, the system retries ignition of the fuel gas at the burner for a predetermined number of attempts by returning to step 34. In the illustrated embodiment, the control unit is configured to retry igniting the fuel gas up to a maximum of three times. Other embodiments can retry for up to a different maximum number of attempts (e.g., one, two, four, five, etc.). If the control unit cannot confirm POF gain (i.e., ignition) after the predetermined number of attempts, then the control unit shuts down the fireplace unit. In some embodiments, the control unit may be configured to provide to a user a status message on a display and/or provide an audible tone or other indication that notifies to the user that the fire installation is being shut down because of, for example, a failure to ignite the fuel gas.

Figure 3A:
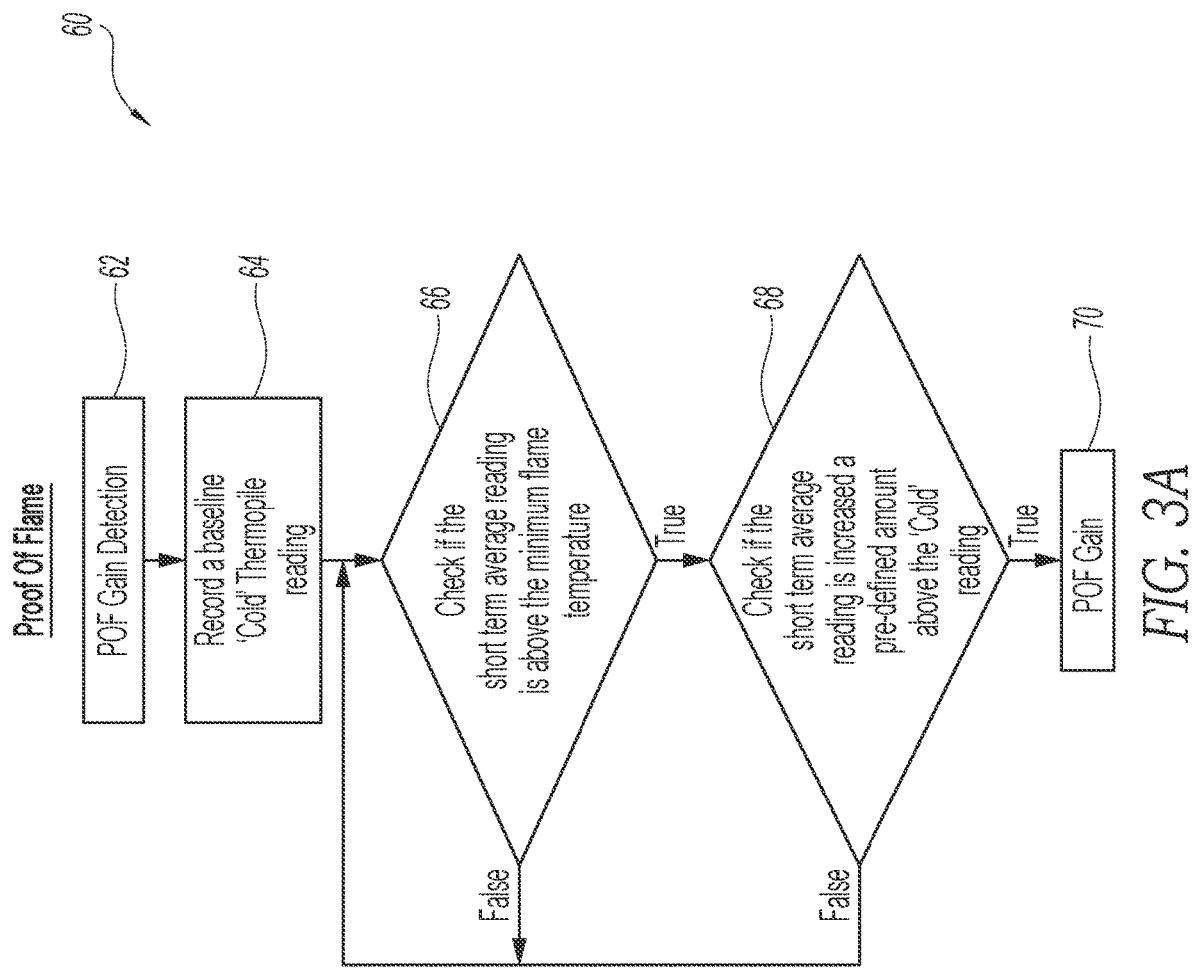
FIG. 3A is a flow diagram illustrating a Proof of Flame gain detection process used with the igniter controller in accordance with one or more aspects of the present technology.

FIG. 3A is a flow diagram illustrating a POF gain process 60 used with the gas-burning fire installation, such as the fireplace, in one or more embodiments of the present technology. In some embodiments, the POF gain process 60 is used at step 40 of the "Ignition" mode 30 illustrated in FIG. 2. The POF gain process 60 includes a POF gain detection sequence 62, wherein at step 64, the control unit communicates with a temperature sensor (e.g., thermopile) and records a baseline cold temperature. At step 66, the control unit determines whether the temperature sensor information is above a predetermined minimum flame temperature. In the illustrated embodiment, a short-term average temperature is used and compared to the predetermined minimum flame temperature. In some embodiments, the short-term average temperature is the average temperature reading over a designated period prior (e.g., 1 second, 1.5 seconds, 2 seconds, etc.). Other embodiments can use different time periods to determine the short-term average temperature.

If, at step 66, the short-term average temperature is not above the predetermined minimum flame temperature, the process 60 repeats step 66 (e.g., until a POF waiting period has elapsed). If, at step 66, the short-term average temperature is above the predetermined minimum flame temperature, then at step 68, the process 60 checks to determine whether the short-term average temperature has increased by at least a predefined temperature difference above the baseline cold temperature recorded at step 64. If so, this indicates that the fuel gas at the burner is burning and, at step 70, POF gain is established or confirmed. If not, the process 60 returns to and repeats step 66 (e.g., until a POF waiting period has elapsed).

Figure 3B:
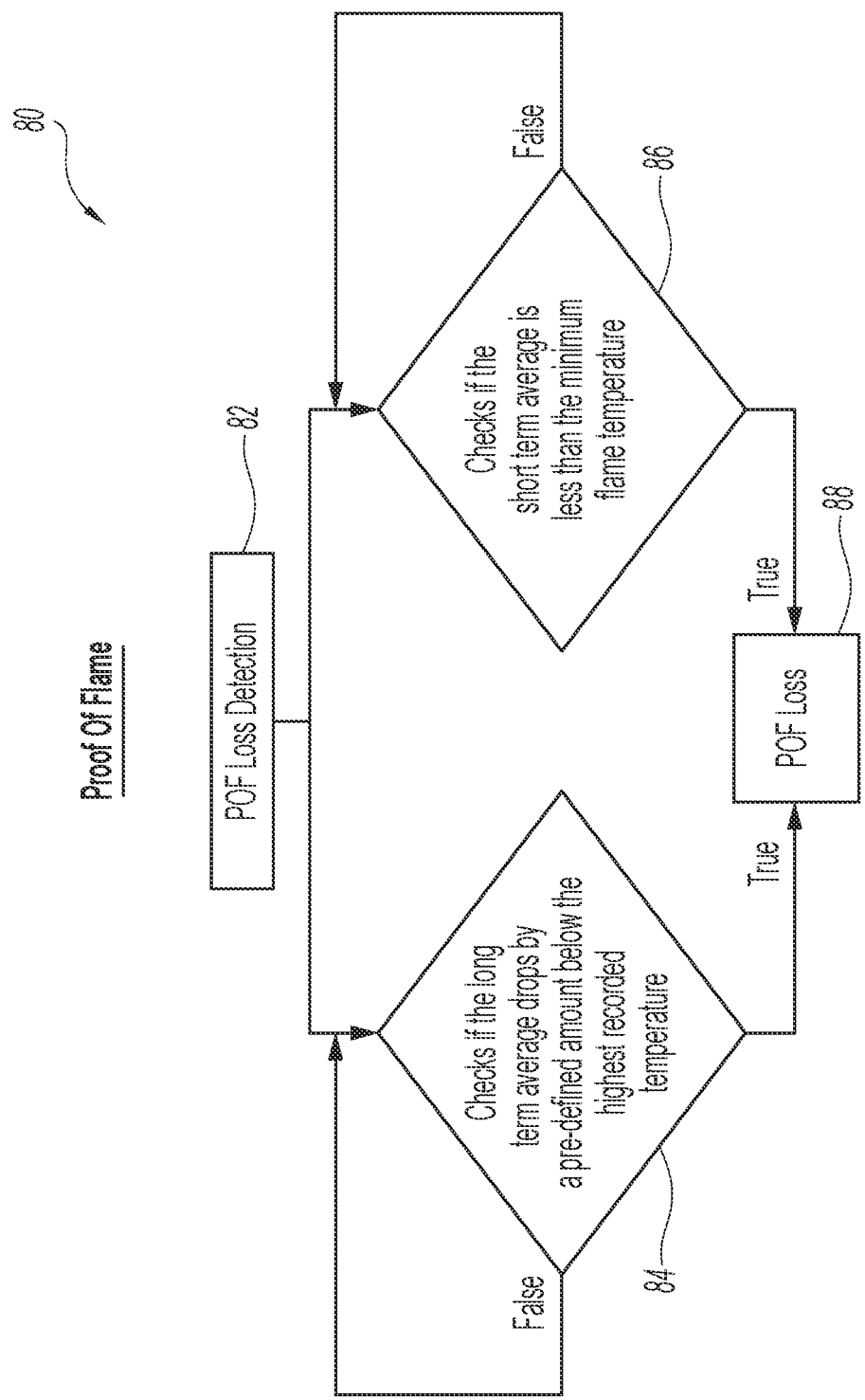
FIG. 3B is a flow diagram illustrating a Proof of Flame loss detection process used with the igniter controller in accordance with one or more aspects of the present technology.

FIG. 3B is a flow diagram illustrating a POF loss process 80 used with the gas-burning fire installation, such as the fireplace, in one or more embodiments of the present technology. In some embodiments, the POF loss process 80 is used at step 48 of the "Run" mode 44 illustrated in FIG. 2. In some embodiments, the POF loss process 80 uses a combination of a trailing stop flame temperature threshold and a static stop flame temperature threshold to determine POF loss.

The POF loss process 80 includes a POF loss detection sequence 82, wherein the control unit determines that either (1) a long-term average temperature has dropped by at least a predetermined temperature difference below a highest recorded temperature (step 84) or (2) the short-term average temperature is below a predetermined minimum flame temperature (step 86). If either is true, this indicates that the flame died and, at step 88, POF loss is established or confirmed. If both are false, the process 80 repeats steps 84 and 86 (e.g., for a selected number of attempts or for a selected period of time).

In some embodiments, the long-term average temperature used at step 84 is the average temperature reading over a designated period prior (e.g., 8 seconds, 9 seconds, 10 seconds, etc.). The highest recorded temperature is a trailing stop and can be obtained by configuring the control unit to keep a running history of an average temperature from a designated period prior (e.g., 40 seconds, 50 seconds, 60 seconds) and recording the highest temperature within the running history. The use of a trailing stop decreases response time compared to using a static stop or threshold (e.g., a static voltage level reading from a thermopile). A reduced response time results in increased safety and flexibility when using the fire installation, allowing the control unit to adapt to other climates and/or burner designs without altered configurations, calibrations, etc. The control unit can detect when the long-term average temperature drops by at least the predetermined temperature difference below the highest recorded temperature by a change in temperature readings, or in a change in a reading corresponding to a temperature reading. For example, a temperature change can be detected by the sensor of monitoring a voltage drop in the sensor, such as a voltage change in the range of approximately 10-20 mV, or other voltage change. This voltage change that corresponds to an actual temperature drop and can be used to determine the trailing stop.

While the use of a trailing stop has the above-mentioned advantages over the use of a static stop or threshold, a static stop or threshold can be more useful when the flame is going out slowly and/or the fuel is running out slowly, and the trailing stop (i.e., the highest recorded temperature within the running history) changes before a sufficient temperature difference can be measured. Therefore, in some embodiments, the control unit uses a combination of a trailing stop and a static stop to determine POF loss. The short-term average temperature used at step 86 may be equal to or different from the short-term average temperature used in the POF gain process 60 (FIG. 2). Similarly, the predetermined minimum flame temperature used at step 86 may be equal to or different from the predetermined minimum flame temperature used in the POF gain process 60 (FIG. 2). In some embodiments, the control unit may be configured to provide to a user a status message on a display and/or provide an audible tone or other indication that notifies to the user that the fire installation is being shut down due to POF loss.

CONCLUSION

The above description and drawings are illustrative and are not to be construed as limiting. Numerous specific details are described to provide a thorough understanding of the disclosure. However, in some instances, well-known details are not described to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

As used herein, the word "or" refers to any possible permutation of a set of items. For example, the phrase "A, B, or C" refers to at least one of A, B, and C, or any combination therefore, such as any of A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

I claim:

1. A gas-burning fire installation, comprising:
   a burner;
   a fuel line coupled to the burner and configured to carry a fuel gas to the burner for ignition;
   a control valve coupled to the fuel line and positioned to control fuel gas flow toward the burner;
   a sensor coupled to the burner;
   an igniter adjacent to the burner; and
   a control unit operatively coupled to the control valve, the sensor, and the igniter, wherein the control unit is configured to operate in an ignition mode and a run mode,
   wherein while operating in the ignition mode, the control unit is configured to:
     turn on power to the control valve, the sensor, and the igniter;
     allow the igniter to heat up for an igniter heating period;
     operate the control valve to direct a flow of fuel gas to a burner of the gas-burning fire installation;
     allow the igniter to ignite the flow of fuel gas at or adjacent to the burner;
     check for Proof of Flame (POF) gain based on data from the sensor;

upon determining that there is POF gain—
switch to operating in the run mode; and
upon determining that there is no POF gain after a POF waiting period—
operate the control valve to terminate the flow of fuel gas to the burner;
turn off the igniter;
wait for a first re-ignition period;
retry ignition of the burner for a predetermined number of attempts; and
turn off power to the control valve and the igniter upon failing to determine that there is POF gain after retrying ignition of the burner for the predetermined number of attempts; and
wherein while operating in the run mode, the control unit is configured to:
repeatedly check for POF loss based on data from the sensor by determining that either (1) a first average temperature measured by the sensor has dropped by at least a predetermined temperature difference below a highest recorded temperture or (2) a second average temperature open measured by the sensor is below a predetermined minimum flame temperature; and
upon determining that there is POF loss—
operate the control valve to terminate the flow of fuel gas to the burner;
wait for a second re-ignition period;
operate the control valve to direct the flow of fuel gas to the burner; and
allow the igniter to reignite the flow of fuel gas at or adjacent to the burner.

2. The gas-burning fire installation of claim 1, wherein when checking for POF gain, the control unit is configured to:
record a baseline cold temperature measured by the sensor;
check if the second average temperature measured by the sensor is above a predetermined minimum flame temperature;
upon determining that the second average temperature is above the predetermined minimum flame temperature—
establish POF gain upon determining that the second average temperature has increased by at least a predetermined temperature difference above the baseline cold temperature;
return to checking if the second average temperature is above the predetermined minimum flame temperature upon determining that the second average has not increased by at least the predetermined temperature difference above the baseline cold temperature;
upon determining that the second average temperature is not above the predetermined minimum flame temperature—
return to checking if the second average temperature is above the predetermined minimum flame temperature.

3. The gas-burning fire installation of claim 1, wherein the igniter heating period is in a range of about 2 seconds to about 6 seconds, wherein the POF waiting period is in a range of about 15 seconds to about 45 seconds, and/or wherein the predetermined number of attempts is in a range of about one to five.

4. The gas-burning fire installation of claim 1, wherein the first re-ignition period is in a range of about 15 seconds to about 45 seconds, and/or wherein the second re-ignition period is in a range of about 60 seconds to about 120 seconds.

5. The gas-burning fire installation of claim 1, wherein the second average temperature comprises an average temperature over a time period of about 1 second to about 2 seconds prior.

6. The gas-burning fire installation of claim 1, wherein first average temperature comprises an average temperature over a time period of about 8 seconds to about 10 seconds prior.

7. The gas-burning fire installation of claim 1, wherein the control unit is further configured to keep a running history of an average temperature over a time period of about 40 seconds to about 60 seconds prior, and wherein the highest recorded temperature is a trailing stop equal to a highest temperature within the running history.

8. A method of operating a gas-burning fire installation, comprising:
operatively coupling a control unit to a control valve, a sensor, and an igniter of the gas-burning fire installation, wherein the control unit is configured to operate in an ignition mode and a run mode;
while operating the control unit in the ignition mode—
turning on power to the control valve, the sensor, and the igniter;
allowing the igniter to heat up for an igniter heating period;
operating the control valve to direct a flow of fuel gas to a burner of the gas-burning fire installation;
allowing the igniter to ignite the flow of fuel gas at or adjacent to the burner;
checking for Proof of Flame (POF) gain based on data from the sensor by;
recording a baseline cold temperature;
checking if a first average temperature measured by the sensor is above a predetermined minimum flame temperature;
upon determining that the first average temperature is above the predetermined minimum flame temperature—
establishing POF gain upon determining that the first average temperature has increased by at least a predetermined temperature difference above the baseline cold temperature;
returning to checking if the first average temperature is above the predetermined minimum flame temperature upon determining that the first average has not increased by at least the predetermined temperature difference above the baseline cold temperature;
upon determining that the first average temperature is not above the predetermined minimum flame temperature—
returning to checking if the first average temperature is above the predetermined minimum flame temperature;
upon determining that there is POF gain—
switching to operate the control unit in the run mode; and
upon determining that there is no POF gain after a POF waiting period—
deactivating the control valve to terminate the flow of fuel gas to the burner;
turning off the igniter;
waiting for a first re-ignition period;

retrying ignition of the burner for a predetermined number of attempts; and turning off power to the control valve, the sensor, and the igniter upon failing to determine that there is POF gain after retrying ignition of the burner for the predetermined number of attempts; and while operating the control unit in the run mode—
repeatedly checking for POF loss based on data from the sensor; and
upon determining that there is POF loss—
operating the control valve to terminate the flow of fuel gas to the burner;
waiting for a second re-ignition period;
reactivating the control valve to direct the flow of fuel gas to the burner; and
allowing the igniter to reignite the flow of fuel gas at or adjacent to the burner.

9. The method of claim 8, wherein checking for POF loss comprises establishing POF loss upon determining that either (1) a second average temperature measured by the sensor has dropped by at least a predetermined temperature difference below a highest recorded temperature or (2) the first average temperature measured by the sensor is below a predetermined minimum flame temperature.

10. The method of claim 8, wherein the igniter heating period is in a range of about 2 seconds to about 6 seconds, wherein the POF waiting period is in a range of about 15 seconds to about 45 seconds, wherein the predetermined number of attempts is in a range of about one to about five, wherein the first re-ignition period is 15 seconds to about 45 seconds, and/or wherein the second re-ignition period is in a range of about 60 seconds to about 120 seconds.

11. The method of claim 8, wherein the first average temperature comprises an average temperature over a time period of about 1 second to about 2 seconds prior.

12. The method of claim 9, wherein the second average temperature comprises an average temperature over a time period of about 8 seconds to about 10 seconds prior, wherein the control unit is further configured to keep a running history of an average temperature over a time period of about 40 seconds to about 60 seconds prior, and wherein the highest recorded temperature is a trailing stop equal to a highest temperature within the running history.

13. A non-transitory computer-readable medium storing instructions for performing a method of operating a gas-burning fire installation that has a control unit coupled to a control valve, a sensor, and an igniter, wherein the control unit is configured to operate in an ignition mode and a run mode, the method comprising:

while operating the control unit in the ignition mode—
turning on power to the control valve, the sensor, and the igniter;
allowing the igniter to heat up for an igniter heating period;
activating the control valve to direct a flow of fuel gas to a burner of the gas-burning fire installation;
allowing the igniter to ignite the flow of fuel gas at or adjacent to the burner;
checking for Proof of Flame (POF) gain based on data from the sensor;
upon determining that there is POF gain—
switching to operate in the run mode; and
upon determining that there is no POF gain after a POF waiting period—
deactivating the control valve to terminate the flow of fuel gas to the burner;
turning off the igniter;
waiting for a first re-ignition period;
retrying ignition of the burner for a predetermined number of attempts; and
turning off power to the control valve, the sensor, and the igniter upon failing to determine that there is POF gain after retrying ignition of the burner for the predetermined number of attempts; and while operating the control unit in the run mode—
repeatedly checking for POF loss based on data from the sensor by determining that either (1) a first average temperature measured by the sensor has dropped by at least a predetermined temperature difference below a highest recorded temperature or (2) a second average temperature measured by the sensor is below a predetermined minimum flame temperature; and
upon determining that there is POF loss—
deactivating the control valve to terminate the flow of fuel gas to the burner;
waiting for a second re-ignition period;
reactivating the control valve to direct the flow of fuel gas to the burner; and
allowing the igniter to reignite the flow of fuel gas at or adjacent to the burner.

14. The non-transitory computer-readable medium of claim 13, wherein checking for POF gain comprises:
recording a baseline cold temperature;
checking if the second average temperature measured by the sensor is above a predetermined minimum flame temperature;
upon determining that the second average temperature is above the predetermined minimum flame temperature—
establishing POF gain upon determining that the second average temperature has increased by at least a predetermined temperature difference above the baseline cold temperature;
returning to checking if the second average temperature is above the predetermined minimum flame temperature upon determining that the second average temperature has not increased by at least the predetermined temperature difference above the baseline cold temperature;
upon determining that the second average temperature is not above the predetermined minimum flame temperature—
returning to checking if the second average temperature is above the predetermined minimum flame temperature.

15. The non-transitory computer-readable medium of claim 13, wherein the igniter heating period is in a range of about 2 seconds to about 6 seconds, wherein the POF waiting period is in a range of about 15 seconds to about 45 seconds, wherein the predetermined number of attempts is in a range of about one to about five, wherein the first re-ignition period is in a range of about 15 seconds to about 45 seconds, and/or wherein the second re-ignition period is in a range of about 60 seconds to about 120 seconds.

16. The non-transitory computer-readable medium of claim 14, wherein the second average temperature comprises an average temperature over a time period of about 1 second to about 2 seconds prior.

17. The non-transitory computer-readable medium of claim 13, wherein the first average temperature comprises an average temperature over a time period of about 8 seconds to about 10 seconds prior, wherein the control unit is further configured to keep a running history of an average temperature over a time period of about 40 seconds to about 60 seconds prior, and wherein the highest recorded temperature is a trailing stop equal to a highest temperature within the running history.

* * * * *